United States Patent Office  3,011,040
Patented Nov. 28, 1961

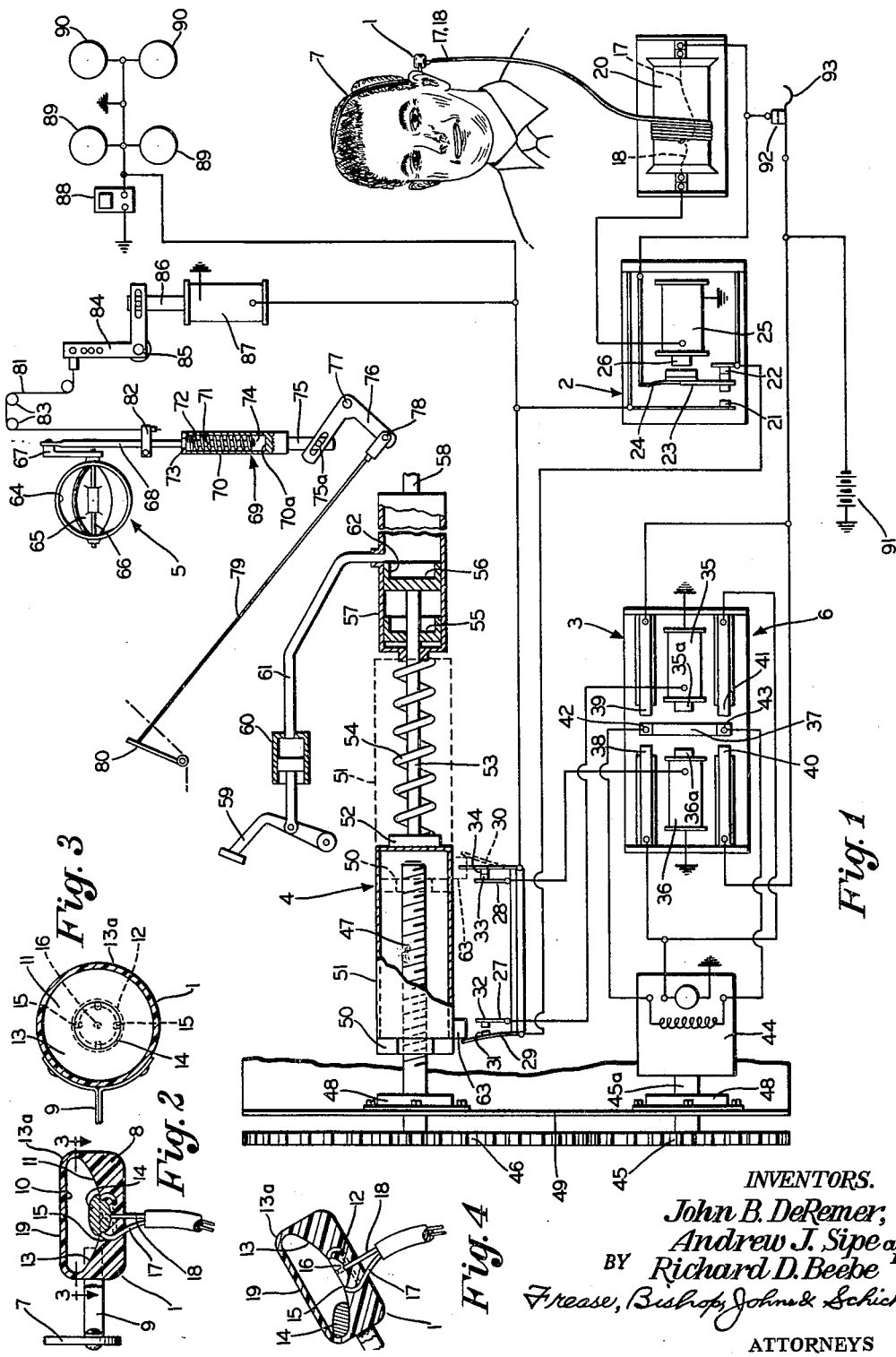

3,011,040
TILT-RESPONSIVE MERCURY SWITCH FOR AUTOMATIC BRAKE CONTROL FOR AUTOMOTIVE VEHICLES
John B. De Remer, 7414 Wales Ave. NW., and Andrew J. Sipe, 3349 Hall Road NW., both of North Canton, Ohio, and Richard D. Beebe, 198 Crescent St. SE., Massillon, Ohio, assignors of small interests to various assignees
Filed Nov. 9, 1959, Ser. No. 851,676
2 Claims. (Cl. 200—152)

This invention relates to a motor vehicle control device and more particularly it pertains to a mechanism for decelerating a motor vehicle by closing fuel supply to the carburetor and for applying brakes in event of the vehicle operator becoming drowsy or unconscious.

In recent years the frequency of automobile accidents on the highways has aroused much interest in providing means for preventing accidents. Various devices have been proposed for assuring positive reaction, such as decelerating and stopping the vehicle or in creating a noise to awaken the driver, in response to the driver's relaxation due to unconsciousness. One such device has been the use of a steering wheel having movable hand grips which when released cause an immediate deceleration and braking of a vehicle. Such a device on a steering wheel, however, is objectionable for several reasons, including the expense of such a steering wheel as well as the fact that all drowsy drivers do not release the steering wheel immediately, for which reason the vehicle proceeds without coming to a stop as soon as it should.

The device of the present invention is dependent upon a more immediate reaction of most drivers due to drowsiness and unconsciousness. An alert conscious driver normally holds his head upright. The device of the present invention is dependent upon that fact and provides a mercury switch which is attached to the driver's head in a comfortable manner. So long as the operator's head is turned through normal movements the switch maintains a closed circuit without setting the decelerating and braking means into operation. However, as soon as the driver's head nods forward, sideways, or backwards beyond limits normally desirable for proper control of a vehicle, the mercury switch is opened, which causes deceleration and stopping of the vehicle.

Accordingly, it is a general object of the present invention to provide a safety control device for a motor vehicle, which device is directly responsive to the operator turning his head beyond limits normally necessary for adequate control of the vehicle.

It is another object of this invention to provide means for actuating certain signal means both to the driver of the vehicle involved and to other vehicles.

Finally, it is an object of this invention to provide an improved safety control device for motor vehicles which incorporates the foregoing desiderata in an inexpensive manner and with simplified maintenance and operation.

These and other objects and advantages apparent to those skilled in the art from the following description and claims may be obtained, the stated results achieved, and the described difficulties overcome by the discoveries, principles, apparatus, parts, elements, combinations, and subcombinations which comprise the present invention, the nature of which is set forth in the following general statement, a preferred embodiment of which—illustrative of the best mode in which applicants have contemplated applying the principles—is set forth in the following description and shown in the drawings, and which is particularly and distinctly pointed out and set forth in the appended claims forming part hereof.

In the accompanying drawings a preferred embodiment of the device of the present invention is illustrated wherein:

FIGURE 1 is a diagrammatic view of the device showing a mercury switch mounted on an operator's head and including an electric circuit;

FIG. 2 is a vertical sectional view through the mercury switch showing the switch disposed in the normally closed position;

FIG. 3 is a horizontal sectional view taken on the lines 3—3 of FIG. 2; and

FIG. 4 is a vertical sectional view of the switch in an open position.

Similar numerals refer to similar parts throughout the several views of the drawing.

As shown in FIG. 1, the control mechanism of the present invention includes a mercury switch 1, relays 2 and 3, brake actuating means 4, valve means 5 for a carburetor, and an electric circuit 6.

The mercury switch 1 is normally mounted in an upright position on the head of a driver of a motor vehicle, as shown in FIG. 1, such as by a headband 7 of conventional construction. For normal driving conditions the switch 1 is in the closed position as shown in FIG. 2. The switch includes a housing 8 of dielectric material which is secured by a connecting link 9 to the headband 7. The interior of the switch 1 includes a switch chamber 10 having a lower wall 11. The lower wall 11 includes a hole or cavity 12 (FIGS. 3 and 4) and an outwardly upwardly sloping wall portion 13 which surrounds the hole 12 throughout 360°.

A ball of mercury 14 is disposed within the chamber 10 so that in the normal position the mercury 14 is disposed within the hole 12 as shown in FIG. 2. The hole 12 is of sufficient depth that the mercury 14 remains in the hole except when the switch 1 is tilted at an angle of greater than 45° as shown in FIG. 4, in which position the mercury 14 rolls out of the hole, thereby opening the circuit through contacts 15 and 16 of wires 17 and 18, respectively. The contacts 15 and 16 may be variously disposed within the hole 12, but as shown in FIGS. 2 and 3, four contacts 15 extend from the wire 17 to equally disposed positions around the upper end of the hole and the contact 16 is centrally disposed at the bottom of the hole. Accordingly, when the mercury 14 is disposed in the hole 12 a closed circuit exists between all or one of the contacts 15 and the contact 16.

As shown in FIGS. 2 to 4, the wall portion 13 surrounding the hole 12 is curved slightly upwardly and outwardly from the periphery of the hole at a slight angle sufficient to cooperate with the depth of the hole 12 to maintain the mercury 14 within the hole during normal movements of the head of the operator of a motor vehicle.

Although the wall portion 13 extends generally outwardly and upwardly, like a saucer, from the hole 12, its angle of slope is not steep enough to prevent the mercury 14 from becoming dislodged from the hole when the operator's head is tilted an abnormal amount, such as at 45° or more, which would occur immediately upon the operator becoming unconscious or drowsy. The slope of the wall portion 13 is sufficient to cause the mercury 14 to flow back into the hole 12 as soon as the operator's head is turned upright so that the switch 1 is substantially in the position of FIG. 2. The switch housing is provided with an upwardly and inwardly curved annular wall 13a at the periphery of said saucer-shaped bottom wall 13, and an upper wall 19 connected to said annular wall 13a to maintain the mercury 14 within the chamber 10 at all times.

As shown in FIG. 1, the combined wires 17 and 18 lead to a reel 20 on which the combined wires 17 and 18 are wound. The reel 20 is spring mounted in a conventional manner to permit the driver to move his head within reasonable limits without interfering with normal operation of the switch 1.

The relay 2 is a single-pole, double-acting relay having a pair of contacts 21 and 22 with a contact arm 23 mounted therebetween. The arm 23 is spring biased by a spring 24 into contact with the contact 22. A solenoid 25 has a plunger 26 which is held in the position shown in FIG. 1 during normal driving operations with the mercury switch 1 upright as shown in FIG. 2, whereby the arm 23 engages the contact 22. When the solenoid 25 is inactivated such as when the mercury switch 1 is tilted to open the circuit through the contacts 15 and 16 as shown in FIG. 4, a spring (not shown) in the solenoid thrusts the plunger outwardly against the arm 23 to cause engagement with the contact 21.

As shown in FIG. 1, the contact 22 is connected to a limit switch 27. Likewise, the contact 21 is connected to a limit switch 28. Both limit switches 27 and 28 are associated with the brake actuating means 4. The switches 27 and 28 include similar spring biased arms 29 and 30 which normally maintain engagement between contacts 31 and 32 of the limit switch 27 and between contacts 33 and 34 of the limit switch 28.

The limit switches 27 and 28 are in turn separately connected to solenoids 35 and 36, respectively, of the relay 3. The relay 3 is a double-pole, double-throw relay including a movable arm 37 responsive to either of the solenoids 35 and 36 and movable between oppositely disposed pairs of contacts 38 and 39 and 40 and 41. Although the arm 37 is composed of a dielectric material, the opposite ends 42 and 43 thereof are provided with metallic contacts. The purpose of the relay is to actuate a reversible motor 44 in one direction or another for operating the brake actuating means 4.

The motor 44, being a series reversible D.C. motor, is provided with a pinion gear 45 which engages a gear 46 mounted on the end of a screw 47. The screw 47, as well as the motor shaft 45a, is mounted in similar spaced thrust bearings 48 that are secured on a mounting plate 49. When the screw 47 is rotated in one direction a nut 50 on the screw moves to the right as shown in FIG. 1. The nut 50 has a housing 51 for the screw 47, the opposite end of which engages the end 52 of a shaft 53 which is spring biased by a coil spring 54 against the housing 51.

As the shaft 53 is moved to the right, a pair of pistons 55 and 56 within a brake cylinder 57 are actuated to apply pressure on brake fluid within the cylinder and through a fluid conduit 58 to the brakes in a conventional manner. In such event a brake pedal 59, which normally operates in conjunction with the cylinder 57 through a cylinder 60 and conduit 61 in the brake system, is rendered inoperative because the piston 56 having a flange 62 closes the point of connection between the conduit 61 and the piston. Inasmuch as the entire cylinder 57 is filled with brake fluid including the space between the pistons 55 and 56, it is impossible for the hydraulic fluid to become contaminated with air due to frequent movement of the pistons in the cylinder 57, which would be the case if the space between the pistons 55 and 56 were not filled with brake fluid.

When the nut 50 on the screw 47 is disposed in the position shown in FIG. 1, the limit switch 27 is held open by a switch actuator 63 on the housing 51. As the nut 50 is moved to the right by the screw 47, the spring biased arm 29 brings the contacts 31 and 32 into engagement.

Conversely, as the nut 50 approaches the right end of the screw 47, at the broken line position, the switch actuator 63 engages the upper end of the spring biased arm 30, thereby breaking the circuit through the contacts 33 and 34. Operation of the screw 47 in one direction or another is, of course, dependent upon operation of the motor 44 which in turn is dependent upon the relay 3. Under normal operating conditions with the mercury switch upright as shown in FIG. 1, the circuit is closed through the contact 22 of the relay 2. The contacts 31 and 32 in the limit switch 27, however, are open so that normal driving operations prevail. During such driving operations the circuit through contacts 33 and 34 of switch 28 is closed, but the contact 21 in the relay 2 is open, thereby maintaining the status quo.

When the mercury switch is tilted more than 45° as shown in FIG. 4, the mercury 14 moves out of the hole 12, thereby breaking the circuit through the contacts 15 and 16 whereby the solenoid 25 is rendered inactive so that the plunger 26 is thrust outwardly by a spring (not shown) against the arm 23 so that the circuit through the contact 21 is closed. Inasmuch as the circuit through the contacts 33 and 34 of the switch 28 is also closed, the solenoid 36 is actuated to thrust the solenoid plunger 36a outwardly against the arm 37 to close the circuit through the contacts 39 and 41 and thence through the motor 44 which actuates the screw 47 and causes the nut 50 to move to the right.

As soon as the switch actuator 63 breaks the circuit through the switch 28 by moving the spring biased arm 30 to the right, the motor 44 stops turning, and the brakes are applied to the vehicle.

Subsequently, when the mercury switch 1 is turned upright again so that the mercury 14 enters the hole 12 and closes the circuit through the contacts 15 and 16, the solenoid 25 is actuated to pull the plunger 26 away from the arm 23 which is normally spring biased in engagement with the contact 22. The circuit, being closed through the limit switch 27, actuates the solenoid 35 which thrusts the plunger 35a of the solenoid outwardly against the arm 37 which normally has a neutral position between the contacts 38—41 as shown in the drawing.

When the plunger 35a closes the circuit through the contacts 38 and 40 of the relay 3 the polarity in the motor 44 is reversed, whereby the screw 47 is turned in the opposite direction and causes the nut 50 to return to the original position as shown in FIG. 1, whereby the brakes of the vehicle are released.

The valve means 5 for the carburetor is of conventional construction and includes an opening 64 through which air enters a carburetor (not shown). The opening 64 is provided with a closure or valve member 65 rotatable about a pin 66 extending across the opening. The outer end of the pin 66 is connected to a lever 67 which rotates the pin.

The end of the lever 67 remote from the pin 66 is pivotally attached to one end of a shaft 68 which is movable longitudinally. The shaft 68 is a part of a compensating link 69 which also includes a tubular-like member 70 in which a portion of the shaft 68 is spring-mounted as shown in FIG. 1 on a helical spring 71. One end of the spring 71 is secured such as by a weld 72 to an end closure 73 of the member 70. The other end of the spring is secured such as by a weld 74 to the inner end of the shaft 68.

At the end of the member 70 opposite the closure 73, an extension link 75 is provided for pivotal connection at 75a to a bell crank 76 which is pivotally mounted at 77. The other end of the bell crank 76 is pivotally connected at 78 to an elongated shaft 79, the opposite end of which is secured to an accelerator pedal 80 in a conventional manner.

As shown in FIG. 1, a cable 81 is connected at one end to the shaft 68 by a bracket 82. The cable 81 is disposed over a number of pulleys 83 and is secured at the other end to a bell crank 84 pivotally mounted at 85. A plunger 86 of a solenoid 87 is attached to the other end of the bell crank 84.

The solenoid 87 when energized pulls the plunger 86 downwardly, thereby rotating the bell crank 84 in a clockwise direction. Such movement of the bell crank 84 pulls the shaft 68 of the compensating link 69 upwardly through the cable 81 in order to close the opening by the valve 5. When the shaft 68 is pulled upwardly by the cable 81, the shaft operates against the force of the spring 71 within the member 70 in order to close the accelerator opening 64, notwithstanding an attempt on the part of the operator to keep it open by manipulation of the accelerator pedal 80. In other words, when the solenoid 87 is actuated, it renders the accelerator pedal 80 inoperative due to the particular construction of the compensating link 69. On the other hand, when the solenoid 87 is inoperative, depression of the accelerator pedal is transferred through the shaft 79, the bell crank 76, and the tubular-like member 70 to the shaft 68 either through the spring 71 or by contact of the end of the shaft by an inner surface 70a of the member 70.

The electric circuit also includes a buzzer 88, as well as headlights 89 and taillights 90. In addition, the circuit includes a battery 91 and a switch 92 having a hook 93 on which the operator may place the headband 7 or mercury switch 1 when it is not in use.

The foregoing construction including elements 64—87 for automatically opening and closing the carburetor valve 5, together with the buzzer 88 and lights 89 and 90 are part of the subject matter disclosed in the copending application of John De Remer, Serial No. 728,715, filed April 15, 1958, now Pat. No. 2,991,839, July 11, 1961.

In the foregoing description certain terms have been used for brevity, clearness and understanding, but no unnecessary limitations are to be implied therefrom as such words are used for descriptive purposes herein and are intended to be broadly construed.

Moreover, the embodiment of the improved construction illustrated and described herein is by way of example and the scope of the present invention is not limited to the exact details of construction shown.

Having now described the features, constructions and principles of the invention, the characteristics of the new automatic vehicle control construction, and the advantageous, new and useful results provided; the new and useful discoveries, principles, parts, elements, combinations, subcombinations, structures and arrangements, and mechanical equivalents obvious to those skilled in the art are set forth in the appended claims.

We claim:

1. A tilt-responsive mercury switch for attachment to a vehicle driver's head for controlling an electric circuit for operating decelerating and braking means on the vehicle, said mercury switch comprising a normally horizontally disposed housing of dielectric material, said housing including a saucer-shaped bottom wall having a centrally located shallow cup-shaped cavity therein, an upwardly and inwardly curved annular wall at the periphery of said saucer-shaped bottom wall, spaced electric contacts in said circuit located within and at the periphery of said cavity, and a ball of mercury normally located substantially entirely in said cavity in contact with said electric contacts when said housing is located in horizontal position, said ball of mercury being adapted to move out of said cavity, out of contact with said electric contacts and onto said saucer-shaped bottom wall and against said annular wall only when said housing is tilted beyond a predetermined angle.

2. A tilt-responsive mercury switch for attachment to a vehicle driver's head for controlling an electric circuit for operating decelerating and braking means on the vehicle, said mercury switch comprising a normally horizontally disposed housing of dielectric material, said housing including a saucer-shaped bottom wall having a centrally located shallow cup-shaped cavity therein, an upwardly and inwardly curved annular wall at the periphery of said saucer-shaped bottom wall, and an upper wall connected to said annular wall, spaced electric contacts in said circuit located within and at the periphery of said cavity, and a ball of mercury normally located substantially entirely within said cavity in contact with said electric contacts when said housing is located in horizontal position, said ball of mercury being adapted to move out of said cavity out of contact with said electric contacts and onto said saucer-shaped bottom wall and against said annular wall only when said housing is tilted beyond a predetermined angle, said upper wall retaining the mercury within said housing.

References Cited in the file of this patent

UNITED STATES PATENTS

| | | |
|---|---|---|
| 977,523 | Gustafson | Dec. 6, 1910 |
| 1,007,998 | Whalton | Nov. 7, 1911 |
| 2,172,116 | Warren | Sept. 5, 1939 |
| 2,192,197 | Muter | Mar 5, 1940 |
| 2,354,687 | Keith et al. | Aug. 1, 1944 |
| 2,713,159 | Morrison | July 12, 1955 |
| 2,734,590 | Hays | Feb. 14, 1956 |
| 2,740,009 | Gaylord et al. | Mar. 27, 1956 |
| 2,747,038 | Perkovich | May 22, 1956 |
| 2,754,497 | Wolpert | July 10, 1956 |
| 2,863,014 | Deer et al. | Dec. 2, 1958 |